Inventors:
Peter C. Rossin, Jr.,
Stanley J. Noesen,
by Paul A. Frank
Their Attorney.

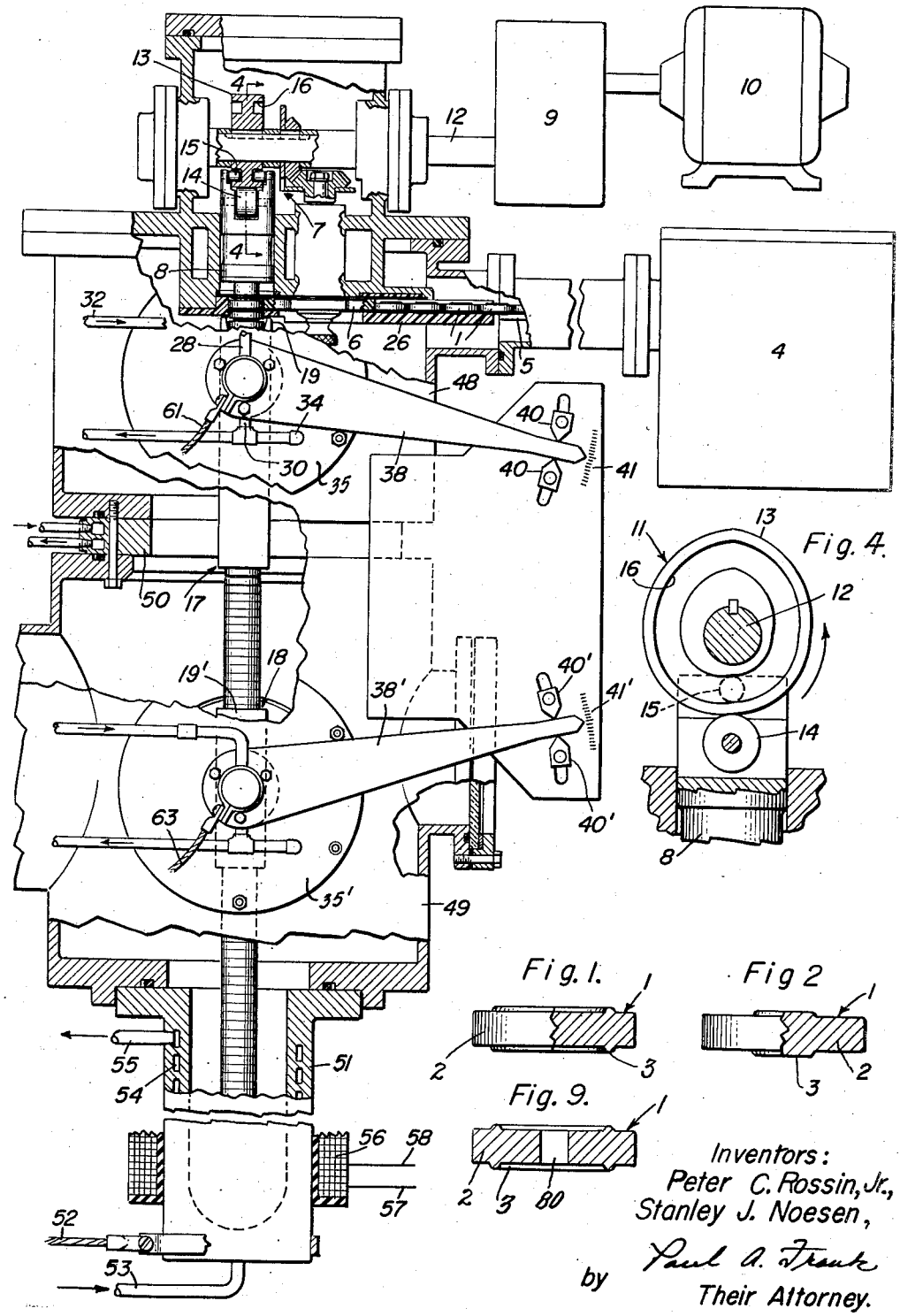

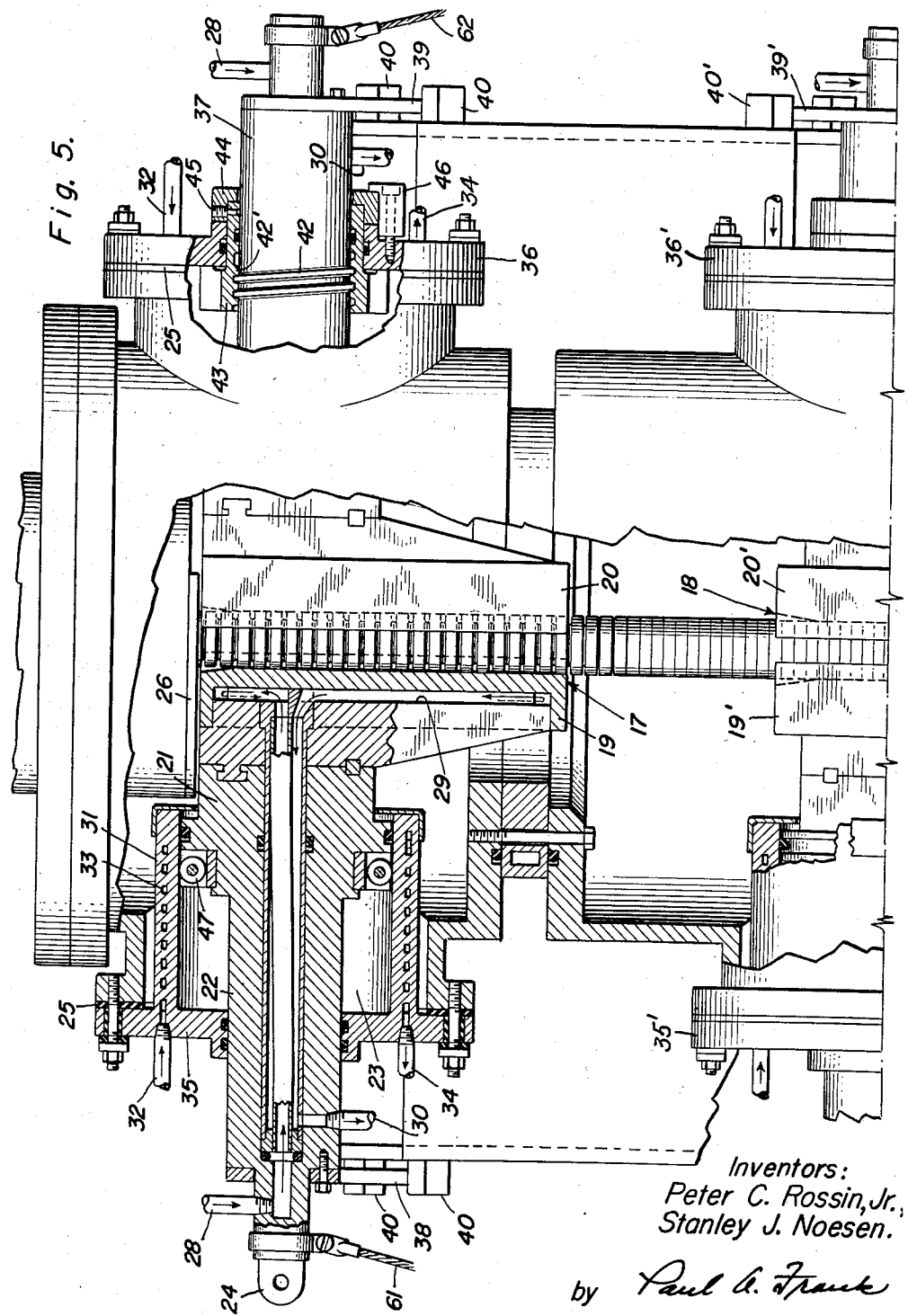

Oct. 6, 1959  P. C. ROSSIN, JR., ET AL  2,907,806
CONSUMABLE ELECTRODE ARC MELTING FURNACE
Filed April 11, 1957  4 Sheets-Sheet 4

Inventors:
Peter C. Rossin, Jr.,
Stanley J. Noesen,
by Paul A. Frank
Their Attorney.

United States Patent Office 2,907,806
Patented Oct. 6, 1959

2,907,806
CONSUMABLE ELECTRODE ARC MELTING FURNACE

Peter C. Rossin, Jr., Bridgeville, Pa., and Stanley J. Noesen, Schenectady, N.Y., assignors to General Electric Company, a corporation of New York Application April 11, 1957, Serial No. 652,226

3 Claims. (Cl. 13—9)

This invention relates to the continuous forming of electrodes prior to melting in an arc melting furnace, and, more particularly, to the formation of a rigid electrode column from pellets of high temperature metals.

The melting of metals as chromium, molybdenum, titanium, niobium, tantalum, tungsten, and the like require temperatures which are generally not economically available in flame type furnaces. In the electric arc furnace, however, temperatures are available in the arc which will satisfactorily melt metals including those above mentioned. The arc of an electrical arc furnace may be provided between an electrode of the metal to be melted and a suitable container, and for either continuous or volume production, the electrode is replaced as needed. Among the replacement methods employed is the successive addition of electrodes or the continuous replenishment or formation of a single moving electrode. For quantity production, the latter method of continuously replenishing or forming the electrode has been found more satisfactory.

Various methods have been utilized in the continuous formation of electrodes to form electrodes of the metal desired. Included among these methods is that of extruding the electrode as a rod formed of a powder of a refractory metal and then sintering the extruded rod to attain the desired structural stability. While this method has proved satisfactory, certain general and well known disadvantages of powdered rods are inherent. For example, such extrusion generally entails a high compacting pressure together with the need in some instances of a suitable binder for the powder. A variation in the pressure or excess powder may produce weak areas in the rod. Furthermore, careful control must be exercised over the density of the powder to prevent the same weakened areas and structural problems resulting therefrom. It may be seen, also, that these and other disadvantages are detrimental to quantity production substantially free from non-controlled stoppages.

Accordingly, it is an object of this invention to provide an improved method of continuously forming an electrode.

It is another object of this invention to provide a continuous electrode having good structural strength.

It is still a further object of this invention to provide a durable and strong electrode comprising a series of sintered metal pellets.

It is yet another object of this invention to provide a molten metal which is substantially gas free.

It is another object of this invention to provide a substantially trouble-free arc melting furnace suitable for volume production.

Briefly stated, in accordance with one object of this invention, a high temperature metal electrode is continuously formed by employing a process of building or stacking individual powdered pellets of the metal to be melted in an electrode form, and sintering the pellets to each other to form a strong continuous structure. It will be apparent to those skilled in the art that this method is equally applicable to arc type furnace electrodes where the electrode is to be formed of a metal melting at a relatively low temperature, and that the sintering may be accomplished by resistance or induction heating.

While this specification concludes with claims particularly pointing out and distinctly setting forth this invention, it is believed that the invention will be better understood from the following description, taken in connection with the accompanying drawings.

Fig. 1 illustrates one form of a pellet utilized in this invention;

Fig. 2 shows a modified form of the pellet of Fig. 1;

Fig. 3 is a cross-sectional view of an arc melting furnace showing the stacking apparatus or method of forming a continuous electrode;

Fig. 4 is an illustration of a cam drive to give reciprocating motion to the ram;

Fig. 5 is a sectional view of the upper set of shoes of Fig. 3;

Fig. 9 is a modified form of the pellet of Figs. 1 and 2.

Referring now to Fig. 1, there is illustrated the pellet or disc 1 of a high melting temperature metal such as chromium, molybdenum, niobium, tantalum, tungsten, and the like, or the alloys of such metals, or also, as will be apparent by the following description, any metal or alloy of good electrical conducting characteristics. Pellet 1 in one preferred form of this invention is a substantially cylindrical disc 2 having a raised portion 3 on the end surfaces thereof. While the portion 3 is shown as an annular section, various projections such as ridges, indentations, or plateaus, Fig. 2 may be utilized for the purposes to be hereinafter described.

Figure 6:
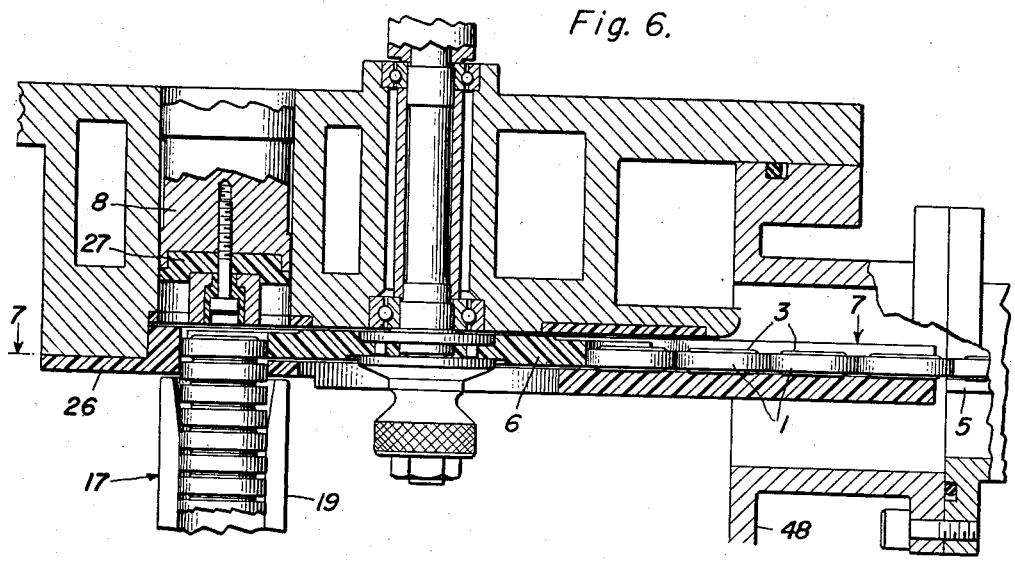
Fig. 6 is a sectional view of the apparatus for feeding and indexing the pellets to form a column.
Figure 7:
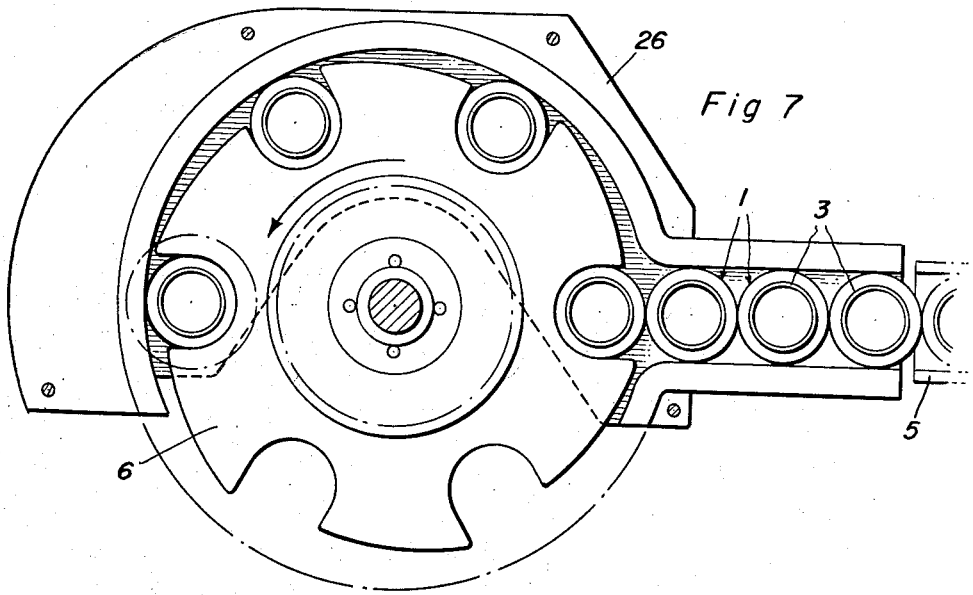
Fig. 7 is an exploded view of the indexing wheel of Fig. 6 taken on line 7—7 of Fig. 6.

Referring to Fig. 3, a supply of pellets 1 is contained in a vibratory feeder 4 or any other form of like feeding device well known in the art, to be fed successively therefrom. From feeder 4 the pellets are moved along a suitable conveyor 5 to an indexing wheel 6, more clearly shown in Figs. 6 and 7. Indexing wheel 6 is driven through any well known type of Geneva or intermittent movement, as indicated by numeral 7, to intermittently place a pellet 1 under a ram 8. Ram 8, which is illustrated as a cylinder or plunger, is driven through a speed change device, if necessary, for example, a gear reduction 9 by a drive means such as a motor 10, to produce a reciprocating motion of ram 8. This reciprocation is generated through any suitable drive apparatus such as cam drive 11, specifically illustrated in Fig. 4.

Referring to Fig. 4, there is shown a drive shaft 12 which is driven by motor 10 through the gear reducer 9 and operates to rotate a cam 13. The ram 8 has a roller 14 thereon which is adjacent the eccentric surface of the cam such that rotation of the cam forces the ram 8 in one direction while a pin 15 riding within an indentation or groove 16 in the cam 13 operates to retract the ram 8, thus generating reciprocating movement. The gear reducer 9, the indexing wheel 6, and the ram 8 are so correlated or interconnected that, as each pellet is placed under the ram 8, the ram 8 moves to force a pellet into a shoe 17.

Referring to Fig. 3, there is shown a pair of shoes 17 and 18 in axial alignment and spaced apart relationship. These shoes are similar in all necessary respects and a description of shoe 17 as sectioned in Fig. 5 suffices for shoe 18. In Fig. 5, shoe 17 is shown as comprising at least a pair of arcuate sections 19 and 20 defining an opening which is made variable by means of a movable section such as 19. The opening is made variable not only to provide for different shoes for various diameter pellets or electrodes but also to accommodate minor irregularities in pellet diameters and to increase or decrease the frictional force between the pellet and the shoes. Section 19 is affixed to a piston 21 and arm 22 which are adapted for movement within a cylinder 23. While many devices are available which will perform the necessary adjustment, a preferred form of this invention employs a pneumatic piston and cylinder arrangement. Where the furnace is operated under vacuum conditions, the forward portion of the cylinder 23 on one side of the piston 21 may be exposed to the vacuum conditions, and the other side vented. The differential pressure acting upon piston 21 moves the piston in a direction to decrease the diameter of the cylindrical bore and increase the force on the pellets. For the purpose of varying this force, suitable weights, not shown, or other means may be attached to piston arm 22 at the end 24 thereof. Alternatively, the piston cylinder arrangement may be operated by supplying a control medium under pressure into the cylinder 23 behind the piston 21.

It may be seen that, in order to prevent pellets from falling from the lower portion of shoe 17, or to originally build a column of pellets between the shoes 17 and 18, a cylindrical section of the metal to be melted or any satisfactory metal is placed between the shoes, and at the start of the operation, the ram 8 places a pellet directly on the cylindrical section. A sintering process is applied between the shoes 17 and 18 to bond the pellets to the cylindrical section and to each other to form a rigid electrode column. The electrical circuit for the sintering process conducts current through the column between shoes 17 and 18 and will be hereinafter described in conjunction with Fig. 8. Shoes 17 and 18, together with the electrode column, are electrically insulated from the remainder of the furnace as indicated in Fig. 5 by insulation 25 around the shoe assembly, insulation 26 between the column and the furnace and, in Fig. 6, insulation 27 on the ram 8.

As the operation proceeds, and additional pellets are placed in shoe 17 by the action of the ram 8, a free or non-laterally supported column of pellets is built up between the shoes 17 and 18, which is subjected not only to resistance heating by the current, but also to a high compressive force applied by the ram 8 and maintained by the frictional force between the pellets and the shoe sections 19 and 20. It may be seen that the raised portions 3 of the pellets 1 are in abutting relationship to each other when the pellets are in column form, and provide, between pellets, a section of reduced area and consequently one of higher resistance electrically. Therefore, the raised portions 3 are subjected to a higher temperature, which in combination with the compressive force imposed by the ram 8 causes the portions 3 not only to deform or flatten but also to be sintered together to form a smooth rigid electrode column.

The sintering or welding process being applied to only the selected areas or raised portions 3 of the pellet 1 permits the remaining areas of the pellets to retain sufficient strength to withstand the combination of high temperature and high pressure which tends to weaken the column and subject it to bending forces.

In conjunction with pellet configuration other means are applied to prevent distortion of the shoes due to high temperature effects and to maintain column alignment.

For temperature control of the shoe faces, shoes 17 and 18 may be cooled by any well known cooling methods. In Fig. 5, shoe 17, and in the same manner shoe 18, are water-cooled. Water, from any suitable source (not shown), is introduced into conduit 28 to flow through piston arm 22 to circulate through passages 29 in the shoe face and return or exit from conduit 30. Each half of each shoe 17 and 18 is cooled in like manner. The walls 31 in cylinder 23 are also water-cooled in order to prevent distortion. Water is circulated by means of conduit 32 around the cylinder walls through passages 33 and exits from conduit 34.

For column bending or compression control, the shoes 17 and 18 are angularly adjustable relative to each other. Referring to Fig. 5, shoes 17 and 18 comprise half sections 19 and 20 and 19' and 20', which are rotatably mounted in their respective covers or supports 35, 36, 35' and 36'. Since each shoe assembly 17 and 18 is similarly adjustable, a description with reference to shoe 17 suffices also for shoe 18. Section 19 of shoe 17 is affixed to the piston 21 and in turn to piston arm 22 which is rotatably mounted in the support or cover 35. Similarly, section 20 of shoe 17 is affixed to arm 37 which is rotatably mounted in support 36. Piston arm 22 and arm 37 project externally of the furnace and have affixed to their free ends lever arms 38 and 39 respectively. These arms are more clearly illustrated in Fig. 3 and are shown in combination with suitable positioning and adjusting means in the form of knife edge locking devices 40 and scaled measuring means 41. It may be seen by this arrangement that by loosening the knife edge locking devices 40 and rotating the lever arms 38 and 39 that the shoe sections are positioned not only relative to each other but also relative to shoe 18 which is accordingly adjustable in the same manner by means of the corresponding parts 38', 39' and 40'.

To adjust the shoes 17 and 18 in a plane perpendicular to the plane of rotation, the section 20 of the shoe 17 and the corresponding section 20' of shoe 18 incorporate an adjusting means which may be in the form shown in Fig. 5. In Fig. 5, shoe sections 20 are affixed to an arm 37 projecting externally of the furnace. Arm 37 has raised threads 42 thereon which engage threads 42' of a sleeve 43. Sleeve 43 is rotatably mounted in support 36 of the furnace, but is in turn affixed to a cap 44 by means of a lock screw 45. Thereafter, the sleeve 43 and the cap 44 are maintained in position relative to the furnace body and the cover 36 by means of a friction lock 46. This arrangement permits, with a loosening of friction lock 46, and knife edge locking devices 40, the turning or rotating of lever arm 39 to in turn rotate the shoe section 20. However, by loosening friction lock 46 only and rotating the cap 44 the sleeve 43 rotates and by means of the mating threads 41 and 42 serves to axially position section 20.

With shoe alignment within proper limits, and the temperature of the shoe faces controlled, the buckling or bending tendency may be additionally minimized through varying the force of the shoe sections against the column, as heretofore described. This force also may be variable to provide for over-sized or under-sized pellets and misalignment in the shoe. However, a high frictional force between piston 21 and cylinder walls 31 may tend to give more or less force than required or intermittently applied forces. In order to have available a smooth application of force under extreme conditions, the cylinder walls are water-cooled to prevent temperature distortion and piston 21 is equipped with guides 47. Guides 47 in one form are a series of curved or barrel rollers in contact with the walls 31 of cylinder 23. In this manner vertical alignment of the walls of shoe section 19 is maintained parallel to the vertical alignment with the column of pellets in the shoe. Accordingly, piston 21 is prevented from cocking or skewering in the cylinder 23, and smooth, uninterrupted pressures may be maintained on the column.

In addition to temperature and alignment control, it should be pointed out that the distance between the shoes or the length of the column being sintered may be varied to conform with the size of the electrode, type of metal, time of operation, and the like. Fig. 3 discloses the furnace to be parted generally into sections 48 and 49. Between sections 48 and 49 one or more water-cooled spacers 50 may be placed to vary the space between the shoes or the length of the column. While, as mentioned, the column length is dependent on many variables, it has been found that a distance of 2 to 10 inches gives satisfactory results in this invention when employed for molybdenum melting of pellets on the order of 1 to 2 inches in diameter.

Proceeding further with the furnace operation, additional pellets are placed on the original cylindrical section, and by the sintering process a rigid electrode column is formed. This column moves out of the lower portion of the shoe 18 and approaches a metal container or crucible 51. Crucible 51 is also connected to the same source of electrical power as indicated for the shoes 17 and 18, by means of a conductor 52. When the electrode column approaches the bottom of the crucible 51, an arc is struck between the electrode and the crucible bottom which commences melting of the end of the electrode. The movement of all parts concerned is regulated such that the electrode is being continuously formed to move toward the crucible 51 at a predetermined speed proportional to the melting of the end of the electrode and to the rise of liquid metal in the crucible.

The molten metal is contained in the crucible 51 which in the case of high temperature metals is cooled, for example by water flowing through entrance conduit 53 circulating through passages 54 and exiting through conduit 55.

As the quantity of molten metal in crucible 51 increases, a stirring action is applied thereto in order to improve the structural properties of the ingot and further aid in the disribution of alloying constituents. Various types of mixing or stirring devices are well known in the prior art, and may be employed in conjunction with this invention. However, one preferred device includes electrical coil 56 encircling the crucible 51 and connected by leads 57 and 58 to a suitable source of electric power, not shown. This type of device is well known in the prior art as a stirrer which utilizes an electromagnetic field in cooperation with the molten metal for stirring purposes.

Various forms of operating means, such as electrical, mechanical and hydraulic or combinations thereof may be employed with this invention. In one preferred form of this invention, electrical operating means together with the sintering circuit produces favorable operation.

Figure 8:
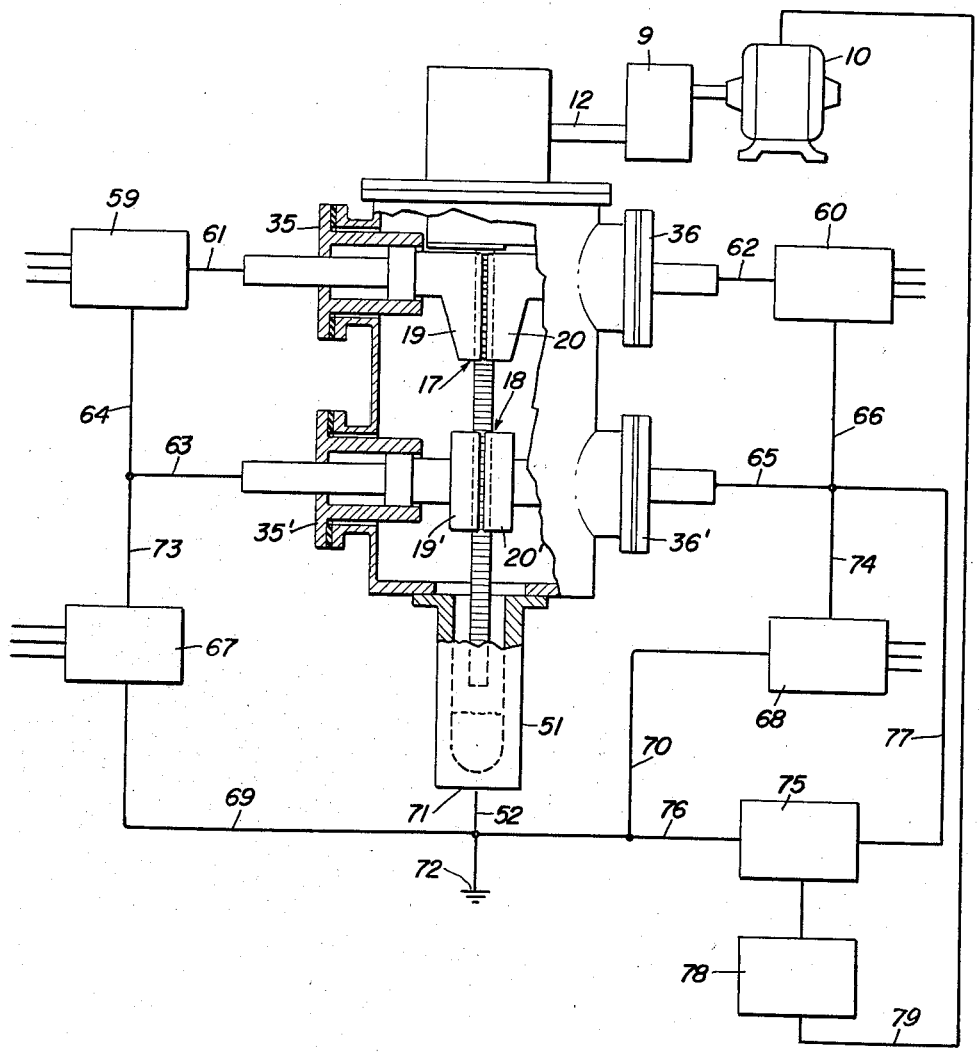
Fig. 8 is a schematic diagram of the electrical circuits involved.

Referring now to Fig. 8, there is shown in schematic form the control circuit both for sintering the pellets into column form and for driving the column toward the crucible. Direct current is provided for the sintering process through a pair of germanium or other suitable rectifiers 59 and 60 connected to a source of 3 phase alternating current voltage, not shown. From the rectifiers 59 and 60, direct current is conducted through leads 61 and 62 into both sections 19 and 20 of shoe 17. From shoe 17 the current is conducted through the stacked pellets for sintering purposes and into the lower shoe 18 where the current is divided to return, in part, through leads 63, 64 and 65, 66, respectively, to the rectifiers 59 and 60.

For the arc circuit an additional pair of rectifiers 67 and 68 connected to a suitable source of 3 phase power, not shown, provide direct current necessary to establish an arc between the electrode column and the bottom of the crucible 51. Rectifiers 67 and 68 are connected by means of leads 69 and 70 respectively to the bottom 71 of the crucible 51 and ground 72. When the lower end of the electrode column has progressed to a predetermined distance from the bottom of the crucible 51 an arc is struck between the electrode and crucible with current flow along the electrode to lower shoe 18. At shoe 18, the current divides to return through leads 63, 73 and leads 65, 74 to the rectifiers 67 and 68 respectively.

Fig. 8 also shows a schematic diagram of the circuit employed to replenish the electrode column as needed, and to move the column toward the bottom of the crucible at a rate proportional to both the melting of the electrode and the rise of the level of the molten metal within the crucible 51. To commence the operation a sensing means or automatic arc control 75 is connected by conductor 76 to the bottom of the crucible 51 and by conductor 77 to the return conductor 74 of one of the rectifiers, such as 68. Arc control 75 is any well known type of voltage control where an input voltage is measured against a predetermined voltage and the difference in the aforementioned voltages supplied to further control means. In Fig. 8 the difference of voltage or the voltage signal is supplied to a thyratron motor control 78 which is well known in the prior art as a gaseous discharge tube able to act as a relay, e.g., a small amount of energy in the grid circuit is able to release a large current in the anode circuit. In this manner the voltage signal from the automatic arc control is supplied to the thyratron control 78 which acts through conductor 79 to vary the field of or control the speed of motor drive 10. When there is no arc between the electrode and the crucible 51, the voltage measured by the automatic arc control is of a relatively high value compared to a predetermined voltage suitable for arc melting and accordingly a large voltage signal is supplied to the thyratron control for operation of motor 10. When the electrode column approaches the bottom of crucible 51 and arcing is established, the voltage as sensed by the automatic arc control 75 is substantially less than that under no arcing conditions and approaches the value of the predetermined melting voltage. Therefore, the voltage difference as supplied to the thyratron control 78 is very small and the speed of motor 10 reduced accordingly.

The invention as disclosed is quite adaptable to varying conditions, such as speed of process, size of electrode, and also quantity production. Additionally, the particular electrode-forming apparatus operates in a trouble-free manner to continuously form an electrode of high rigidity and strength characteristics under, if desirable, completely automatic and/or remote control.

It should be apparent that the pellet forming electrode not only suffices for the required rigidity but is quite adaptable for alloy melting. Heretofore, in the use of powdered rods the several powders making up the alloy would not, during the feeding and forming process, maintain the required interspersion such that the alloy composition was subject to variance not only in the column, but also in the crucible. With the pellets as described, powder mixing is restricted to the small pellet volume and alloy percentages may be maintained within close limits in the pellets in the electrode column, and accordingly, in the melt, at any stage of operation.

In the operation of this furnace, the sintering process takes place within the furnace under the combination of high temperature and vacuum conditions. It is apparent, therefore, that these conditions contribute greatly to purifying the electrode by the removal of impurities and entrapped gases. Accordingly, it has been found that the melt produced from this furnace is of a high degree of purity.

Where the electrode contains a higher degree of elements such as carbon and oxygen, than is desirable, suitable reactive agents may be admitted to the vicinity of the arc for their removal. The electrode of this invention is readily adaptable to such admission to the arc vicinity by various well known methods including having an aperture 80 in the pellets as illustrated in Fig. 9. Any suitable introduction means may then be employed with the electrode column or the forming means to introduce the reactive agent through the column to the arc at the end thereof.

While other modifications of this invention and variations of apparatus that may be employed within the

What we claim as new and desire to secure by Letters Patent of the United States is:

1. An arc melting furnace including a furnace body, a crucible, and utilizing metal pellets to continuously form an electrode comprising in combination, a column forming apparatus disposed within said furnace body, said column forming apparatus including a pair of spaced apart shoes to maintain a column of pellets therebetween, feeding means sequentially positioning pellets on said column, heating means maintaining the column of pellets between said shoes about the sintering temperature of the pellets, said heating means including an electrical circuit to establish a flow of current through said column between said shoes, means applying a compressive force to said column between said shoes, said heating means and said compressing means joining said column of pellets by sintering, said compressing means moving the column of sintered pellets from said shoes into said crucible, and means for continuously arc melting the electrode column thus formed.

2. An arc melting furnace including a furnace body, a crucible, and utilizing metal pellets to continuously form an electrode comprising in combination, a column forming apparatus disposed within said furnace body, said column forming apparatus including a pair of spaced apart shoes to maintain a column of pellets therebetween, feeding means sequentially positioning pellets on said column, heating means maintaining the column of pellets between said shoes about the sintering temperature of the pellets, said means including an electrical circuit to establish a flow of current through said column between said shoes, means applying a compressive force to said column between said shoes, said heating means and said compressing means joining said column of pellets by sintering, said compressing means moving the column of sintered pellets from said shoes into said crucible, means for continuously arc melting the electrode column thus formed, and adjusting means to adjust the alignment between said spaced apart shoes.

3. An arc melting furnace including a furnace body, a crucible, and utilizing metal pellets to continuously form and melt an electrode comprising in combination, a column forming apparatus disposed within said furnace body, said column forming apparatus including a pair of spaced apart shoes to maintain a column of pellets therebetween, indexing means sequentially positioning pellets on said column, heating means maintaining the column of pellets between said shoes above the sintering temperature of the pellets, said means including an electrical circuit to establish a flow of current through said column between said shoes, adjusting means in said bottom shoe to adjust the retaining force between said shoe and the column of pellets, means applying a compressive force to said column, said compressive applying force and said current flow cooperating to join said column of pellets by sintering, means moving the column of sintered pellets from said shoes into said crucible, means for continuously arc melting the electrode column, and means to angularly adjust externally of said furnace each of said spaced apart shoes.

References Cited in the file of this patent

UNITED STATES PATENTS

| | | |
|---|---|---|
| 1,155,426 | Liebmann et al. | Oct. 5, 1915 |
| 1,839,927 | Neuhauss | Jan. 5, 1932 |
| 2,539,912 | Journeaux | Jan. 30, 1951 |
| 2,570,198 | Brager | Oct. 9, 1951 |
| 2,636,102 | Lobosco | Apr. 21, 1953 |
| 2,640,860 | Herres | June 2, 1953 |
| 2,686,822 | Evans et al. | Aug. 17, 1954 |
| 2,762,856 | Newcomb et al. | Sept. 11, 1956 |